(12) United States Patent
Konishi

(10) Patent No.: US 11,139,484 B2
(45) Date of Patent: Oct. 5, 2021

(54) METHOD OF FORMING GAS DIFFUSION LAYER ON CARBON PAPER USED IN FUEL CELLS AND CARBON PAPER HAVING GAS DIFFUSION LAYER FORMED THEREON USED IN FUEL CELLS

(71) Applicant: HONDA MOTOR CO., LTD., Tokyo (JP)

(72) Inventor: Shunsuke Konishi, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 61 days.

(21) Appl. No.: 16/676,136

(22) Filed: Nov. 6, 2019

(65) Prior Publication Data

US 2020/0152995 A1 May 14, 2020

(30) Foreign Application Priority Data

Nov. 9, 2018 (JP) .............................. JP2018-211598

(51) Int. Cl.
*H01M 4/88* (2006.01)

(52) U.S. Cl.
CPC ....... *H01M 4/8807* (2013.01); *H01M 4/8821* (2013.01)

(58) Field of Classification Search
CPC ............. H01M 4/8605; H01M 4/8807; H01M 4/8821; Y02E 60/50
See application file for complete search history.

(56) References Cited

U.S. PATENT DOCUMENTS

2003/0022057 A1* 1/2003 Iwasaki ............... H01M 4/8896
502/101
2019/0027761 A1* 1/2019 Miyake ................... H01M 4/96

FOREIGN PATENT DOCUMENTS

JP 62-12267 1/1987
WO WO 2017-110690 * 6/2017

* cited by examiner

*Primary Examiner* — Brittany L Raymond
(74) *Attorney, Agent, or Firm* — Rankin, Hill & Clark LLP

(57) ABSTRACT

Provided are a method of forming a gas diffusion layer on carbon paper, the method being capable of balancing smoothness with air permeability and water drainage ability in the gas diffusion layer as an underlayer, as well as the carbon paper having the gas diffusion layer formed thereon used in fuel cells. The method of forming a gas diffusion layer (L2) on carbon paper (CP) used in fuel cells includes the steps of: forming a water-repellent layer (L1) on the surface of the carbon paper (CP), forming a crack (CR) in the water-repellent layer (L1), and forming the gas diffusion layer (L2) on the water-repellent layer (L1) having the crack (CR) formed therein.

3 Claims, 3 Drawing Sheets

METHOD OF FORMING GAS DIFFUSION LAYER ON CARBON PAPER USED IN FUEL CELLS AND CARBON PAPER HAVING GAS DIFFUSION LAYER FORMED THEREON USED IN FUEL CELLS

This application is based on and claims the benefit of priority from Japanese Patent Application No. 2018-211598, filed on 9 Nov. 2018, the content of which is incorporated herein by reference.

BACKGROUND OF THE INVENTION

Field of the Invention

The present invention relates to a method of forming a gas diffusion layer on carbon paper used in fuel cells, and to carbon paper having a gas diffusion layer formed thereon.

Related Art

Conventionally, in a fuel cell having carbon paper on which a gas diffusion layer is formed after a water-repellent layer is formed on the carbon paper and dried (e.g., Patent Document 1), moisture generated at the time of power generation is discharged to the carbon paper through the gas diffusion layer and the water-repellent layer.

Patent Document 1: Japanese Unexamined Utility Model Application, Publication No. S62-12267

SUMMARY OF THE INVENTION

The gas diffusion layer, which is an underlayer of the fuel cell, is required to have air permeability and water drainage ability, and is also required to have smoothness for forming an electrode layer. However, since smoothness, and air permeability and water drainage ability, required for the underlayer, are contradictory, it is not easy to produce fuel cells stably by balancing smoothness with air permeability and water drainage ability, resulting in the deterioration of the yield.

It is an object of the present invention to provide a method of forming a gas diffusion layer on carbon paper, the method being capable of balancing smoothness with air permeability and water drainage ability in the gas diffusion layer as an underlayer, as well as the carbon paper having the gas diffusion layer formed thereon used in fuel cells.

To achieve the above-mentioned object, the present invention provides a method of forming a gas diffusion layer on carbon paper used in fuel cells, the method including the steps of: forming a water-repellent layer (e.g., the water-repellent layer L1 described later) on a surface of the carbon paper (e.g., the carbon paper CP described later), forming a crack (e.g., the crack CR described later) in the water-repellent layer, and forming a gas diffusion layer (e.g., the gas diffusion layer L2 described later) on the water-repellent layer having the crack formed therein.

According to the present invention, the smoothness for forming an electrode layer is ensured in the gas diffusion layer, which is the underlayer of the fuel cell. Further, a crack can also be formed in the gas diffusion layer in a state in which a portion of the gas diffusion layer enters the crack. As a result, water drainage ability is ensured in the gas diffusion layer and the water-repellent layer, and it is possible to stably produce fuel cells by balancing smoothness with water drainage ability in the gas diffusion layer and the water-repellent layer; thus, the yield can be improved.

In the step of forming the crack, the crack is formed in the water-repellent layer by drying the water-repellent layer at a rate at which the crack is formed in a water-repellent material of the water-repellent layer. Therefore, the crack can be formed in the water-repellent layer while the water-repellent layer is dried; thus, it is possible to easily form the crack in the water-repellent layer.

In addition, the present invention provides carbon paper having a gas diffusion layer formed thereon used in fuel cells, the carbon paper including carbon paper (e.g., the carbon paper CP described later), a water-repellent layer (e.g., the water-repellent layer L1 described later) formed on a surface of the carbon paper, and a gas diffusion layer (e.g., the gas diffusion layer L2 described later) formed on the water-repellent layer, wherein a crack (e.g., the crack CR described later) is formed in the water-repellent layer, and a portion of the gas diffusion layer enters the crack in the water-repellent layer so as to cover a portion of the water-repellent layer that forms the crack in the water-repellent layer.

According to the present invention, since the crack is formed in the gas diffusion layer similarly to the water-repellent layer, it is possible to make carbon paper having the gas diffusion layer formed thereon in which water drainage ability is achieved in the water-repellent layer and the gas diffusion layer.

According to the present invention, it is possible to provide the method of forming the gas diffusion layer on the carbon paper, the method being capable of balancing smoothness with air permeability and water drainage ability in the gas diffusion layer as the underlayer, as well as the carbon paper having the gas diffusion layer formed thereon used in the fuel cells.

DETAILED DESCRIPTION OF THE INVENTION

Figure 1:
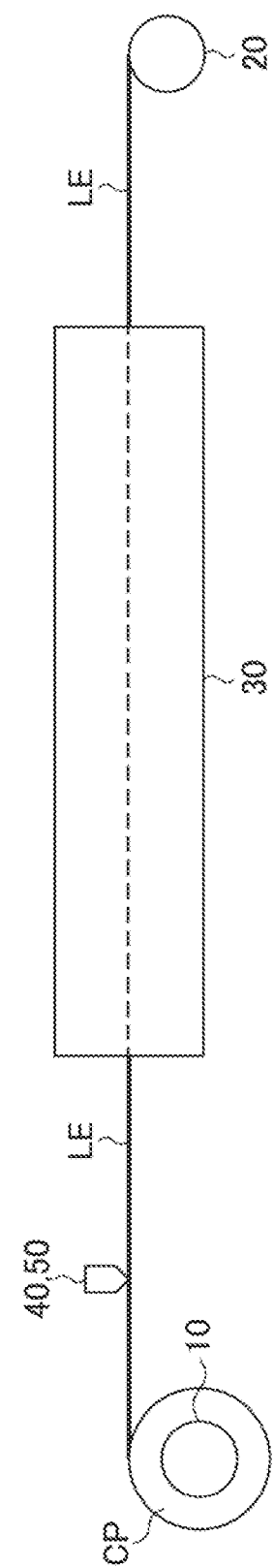
FIG. 1 is a schematic view showing a processing apparatus for carbon paper for carrying out a method of forming a gas diffusion layer on carbon paper of the present invention.

An embodiment of the present invention will be described below with reference to the drawings. FIG. 1 is a schematic view showing a processing apparatus 1 for carbon paper for carrying out a method of forming a gas diffusion layer on carbon paper.

The processing apparatus 1 for carbon paper for carrying out the method of forming the gas diffusion layer on the carbon paper is an apparatus for forming electrolyte membranes and the like by applying coatings for forming electrodes and a water-repellent layer L1 on carbon paper CP constituting a fuel cell. As shown in FIG. 1, the processing apparatus includes a feeding roller 10, a take-up roller 20, a drying oven 30 as a heating oven that performs heating processing, and a die head 40 or an underlayer forming section 50.

The carbon paper CP is wound around the feeding roller 10 in advance, and the feeding roller 10 feeds the carbon paper CP toward the take-up roller 20. The die head 40 applies a coating for forming the water-repellent layer L1 to the carbon paper CP fed out from the feeding roller 10. The interior of the drying oven 30 is set to a high-temperature atmosphere of, for example, about 200° C. The carbon paper CP, to which the water-repellent layer L1 has been applied by the die head 40, is passed through the interior of the drying oven 30, thereby drying the applied water-repellent layer L1 in a short time to form the water-repellent layer L1 having a crack CR formed therein. After the water-repellent layer L1 formed on the carbon paper CP is dried, the take-up roller 20 takes up the carbon paper CP having the water-repellent layer L1 formed thereon. Similarly, the carbon paper CP having the water-repellent layer L1 formed thereon is set on the feeding roller 10, and is fed toward the take-up roller 20. The underlayer forming section 50 applies a coating on the water-repellent layer L1 having a crack CR formed therein, which is formed on the carbon paper CP, to form a gas diffusion layer L2 as an underlayer. After the gas diffusion layer L2 formed on the carbon paper CP is dried by the drying oven 30, the take-up roller 20 takes up the carbon paper CP on which the water-repellent layer L1 and the gas diffusion layer L2 are formed.

A heat-resistant lead LE is connected to the front end portion of the carbon paper CP fed out from the feeding roller 10. The heat-resistant lead LE is comprised of a polyimide resin film having the same width as that of the carbon paper CP. One end portion of the heat-resistant lead LE is fixed to the take-up roller 20, and is wound around the take-up roller 20. A similar heat-resistant lead LE is also connected to the rear end portion of the carbon paper CP.

The heat-resistant lead LE has a length from the feeding roller 10 to the take-up roller 20 through the die head 40 or the underlayer forming section 50 and the drying oven 30, and the other end portion of the heat-resistant lead LE is bonded to the front end portion of the carbon paper CP fed out from the feeding roller 10 with an adhesive comprised of a polyimide amide-based thermosetting resin, so called varnish. Therefore, after the heat-resistant lead LE passes through the die head 40 or the underlayer forming section 50 and the drying oven 30 and is taken up by the take-up roller 20, the carbon paper CP also passes through the die head 40 or the underlayer forming section 50 and the drying oven 30 and is taken up by the take-up roller 20.

Figure 2:
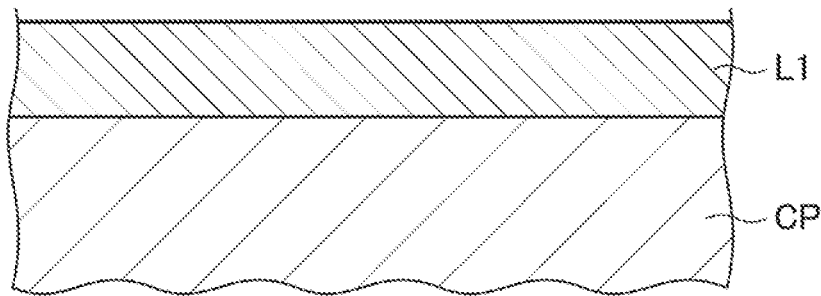
FIG. 2 is a schematic view showing a state in which a water-repellent layer is formed on the carbon paper in the method of forming the gas diffusion layer on the carbon paper of the present invention.
Figure 3:
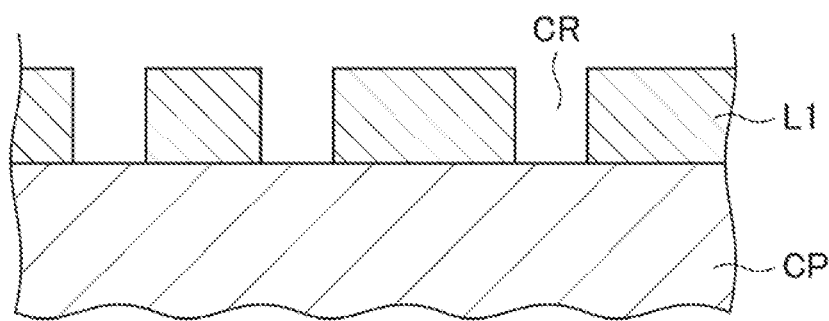
FIG. 3 is a schematic view showing a state in which cracks are formed in the water-repellent layer formed on the carbon paper in the method of forming the gas diffusion layer on the carbon paper of the present invention.
Figure 4:
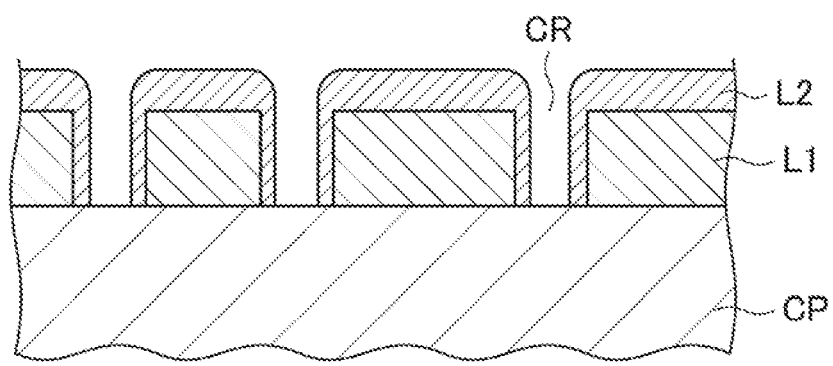
FIG. 4 is a schematic view showing a state in which a gas diffusion layer is formed on the water-repellent layer formed on the carbon paper in the method of forming the gas diffusion layer on the carbon paper of the present invention.

Next, the method of forming the gas diffusion layer on the carbon paper will be described. FIG. 2 is a schematic view showing a state in which the water-repellent layer L1 is formed on the carbon paper CP in the method of forming the gas diffusion layer on the carbon paper. FIG. 3 is a schematic view showing a state in which cracks are formed in the water-repellent layer L1 formed on the carbon paper CP in the method of forming the gas diffusion layer L2 on the carbon paper CP. FIG. 4 is a schematic view showing a state in which the gas diffusion layer L2 is formed on the water-repellent layer L1 formed on the carbon paper CP in the method of forming the gas diffusion layer L2 on the carbon paper CP.

In the method of forming the gas diffusion layer on the carbon paper, the step of forming the water-repellent layer L1 on the carbon paper CP is first carried out. Specifically, a coating is applied to the carbon paper CP fed out from the feeding roller 10 by the die head 40, and as shown in FIG. 2, the water-repellent layer L1 is formed on the carbon paper CP. The coating is applied by coating the fiber surface of the sheet-like carbon paper CP with a fluorine-based water-repellent material (polymer).

Next, the step of forming a crack CR in the water-repellent layer L1 is performed. In the step of forming the crack CR, the crack CR is formed in the water-repellent layer L1 by drying the water-repellent layer L1 at a rate at which the crack CR is formed in the water-repellent material of the water-repellent layer L1. Specifically, the water-repellent layer L1 is dried by passing the carbon paper CP, on which the water-repellent layer L1 is formed by applying the coating with the die head 40, through the drying oven 30. As a result, as shown in FIG. 3, the cracks CR are formed in the water-repellent layer L1. The drying of the water-repellent layer L1 is performed by passing the carbon paper CP, on which electrodes and the water-repellent layer L1 are formed, through the drying oven 30 in an atmosphere of 200° C. for about 30 seconds to 1 minute. The carbon paper CP on which the water-repellent layer L1 is formed is taken up by the take-up roller 20.

Next, the step of forming the gas diffusion layer L2 on the water-repellent layer L1 having the cracks CR formed therein is performed. Specifically, the carbon paper CP having the water-repellent layer L1 formed thereon is set on the feeding roller 10, and is fed toward the take-up roller 20. A coating is applied on the water-repellent layer L1 having the cracks CR formed therein with the underlayer forming section 50 and dried with the drying oven 30 to form the gas diffusion layer L2. The coating is applied by coating carbon particles as a structural material with a fluorine-based water-repellent material (polymer). As a result, as shown in FIG. 4, a portion of the gas diffusion layer L2 enters the crack CR formed in the water-repellent layer L1.

In other words, as shown in FIG. 4, the carbon paper CP having the gas diffusion layer L2 formed thereon used in fuel cells includes the carbon paper CP, the water-repellent layer L1 formed on the surface of the carbon paper CP, and the gas diffusion layer L2 formed on the water-repellent layer L1. As shown in FIG. 4, a portion of the gas diffusion layer L2 enters the crack CR formed in the water-repellent layer L1 so as to cover a portion of the water-repellent layer L1 that forms the crack CR in the water-repellent layer L1.

Figure 5:
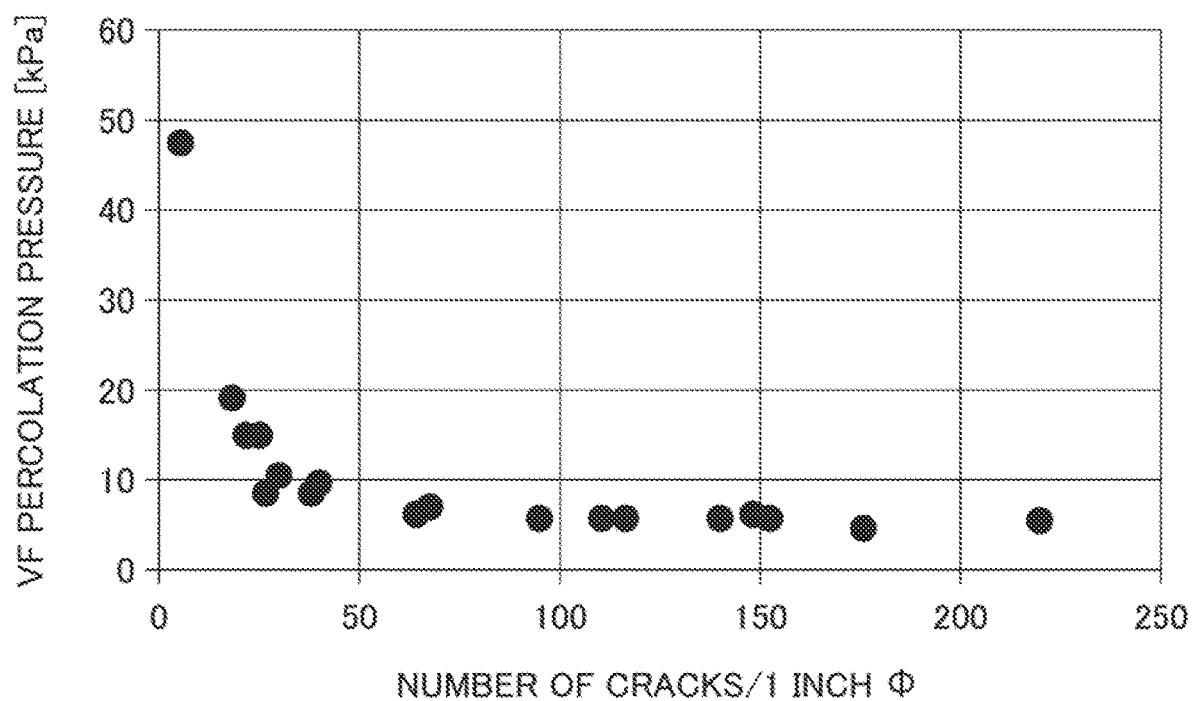
FIG. 5 is a graph showing the results of a test to confirm percolation pressure in a case in which cracks are formed in the water-repellent layer and the gas diffusion layer that are formed on the carbon paper.

Next, an experiment was conducted to examine the relationship between the crack CR formed in the water-repellent layer L1 and the gas diffusion layer L2 and the percolation pressure. In the experiment, water was pressed against each of samples of the carbon paper CP in which the number of cracks CR formed in the water-repellent layer L1 and the gas diffusion layer L2 was a predetermined value, and, while increasing pressure, a value was obtained when water permeated and pressure rise plateaued. The unit "number of cracks/1 inch Φ" for the number of cracks refers to the number of cracks present in the range of 1 inch Φ in the sample, by defining as cracks, portions that are transmissive when light is transmitted from the back side of the sample. The test results are as shown in the graph of FIG. 5. FIG. 5 is a graph showing the results of the test to confirm percolation pressure in a case where the cracks CR are formed in the water-repellent layer L1 and the gas diffusion layer L2 formed on the carbon paper CP.

As shown in FIG. 5, in the range of the value of "number of cracks/1 inch Φ" of 0 to 30, the percolation pressure greatly decreases as the number of cracks increases. Therefore, it is understood that the larger the number of cracks, the more water can be made to pass through. As in the present embodiment, the cracks CR are formed by drying the water-repellent layer L1 at a high temperature of 200° C. in the drying oven 30, thereby enabling water to easily pass through the water-repellent layer L1 and the gas diffusion layer L2, and thus, water drainage ability can be enhanced. However, in the range of the value of "number of cracks/1 inch Φ" of over 30, the percolation pressure does not change much even if the number of cracks increases, and the percolation pressure is stably low. Therefore, this range is preferable. The value of "number of cracks/1 inch Φ" can be increased by a method such as increasing the drying time of the water-repellent layer L1 or raising the drying temperature.

According to the present embodiment, the following effects are achieved. In the present embodiment, the method of forming the gas diffusion layer on the carbon paper used in fuel cells includes the steps of: forming the water-repellent layer L1 on the surface of the carbon paper CP, forming the crack CR in the water-repellent layer L1, and forming the gas diffusion layer L2 on the water-repellent layer L1 having the crack CR formed therein.

As a result, the smoothness for forming an electrode layer is ensured in the gas diffusion layer L2, which is the underlayer of the fuel cell. Further, it is possible to bring the gas diffusion layer L2 into a state in which the crack CR is formed, in a state in which a portion of the gas diffusion layer L2 enters the crack CR. As a result, water drainage ability can be ensured in the gas diffusion layer L2 and the water-repellent layer L1, and it is possible to produce the fuel cells stably by balancing smoothness with water drainage ability in the gas diffusion layer L2 and the water-repellent layer L1, resulting in an improvement in the yield.

In the step of forming the crack CR in the present embodiment, the crack CR is formed in the water-repellent layer L1 by drying the water-repellent layer L1 at a rate at which the crack CR is formed in the water-repellent material of the water-repellent layer L1. Therefore, the crack CR can be formed in the water-repellent layer L1 while the water-repellent layer L1 is dried; thus, it is possible to easily form the crack CR in the water-repellent layer L1.

In the present embodiment, the carbon paper CP having the gas diffusion layer L2 formed thereon used in the fuel cells includes the carbon paper CP, the water-repellent layer L1 formed on the surface of the carbon paper CP, and the gas diffusion layer L2 formed on the water-repellent layer L1. The crack CR is formed in the water-repellent layer L1, and a portion of the gas diffusion layer L2 enters the crack CR formed in the water-repellent layer L1 so as to cover a portion of the water-repellent layer L1 that forms the crack CR in the water-repellent layer L1. Therefore, since the crack CR is formed in the gas diffusion layer L2 similarly to the water-repellent layer L1, it is possible to produce the carbon paper CP having the gas diffusion layer L2 formed thereon in which water drainage ability is achieved in the water-repellent layer L1 and the gas diffusion layer L2.

The present invention is not limited to the above-mentioned embodiment, and variations, improvements, and the like within the scope of achieving the object of the present invention are included in the present invention. For example, in the present embodiment, in the step of forming the crack CR, the crack CR is formed in the water-repellent layer L1 by drying the water-repellent layer L1 at a rate at which the crack CR is formed in the water-repellent material of the water-repellent layer L1, but the present invention is not limited to this method. For example, the crack CR may be formed by mechanical machining.

The materials, configurations, and the like of the carbon paper, the water-repellent layer, the gas diffusion layer, and the like in the present invention are not limited to the materials, configurations, and the like of the carbon paper CP, the water-repellent layer L1, the gas diffusion layer L2, and the like in the present embodiment. Similarly, the respective steps of the method of forming the gas diffusion layer on the carbon paper and the apparatus for performing the method of forming the gas diffusion layer on the carbon paper in the present invention are not limited to the respective steps and the processing apparatus 1 for carbon paper in the present embodiment. For example, in the step of forming the crack CR in the water-repellent layer L1, the water-repellent layer L1 is dried by passing the carbon paper CP having electrodes and the water-repellent layer L1 formed thereon through the drying oven 30 in an atmosphere of 200° C. for about 30 seconds to 1 minute, but this step is not limited thereto. For example, the drying time and temperature may be changed as appropriate according to the materials and the like of the water-repellent layer and the gas diffusion layer.

EXPLANATION OF REFERENCE NUMERALS

CP CARBON PAPER
CR CRACK
L1 WATER-REPELLENT LAYER
L2 GAS DIFFUSION LAYER

What is claimed is:

1. A method of forming a gas diffusion layer on carbon paper used in fuel cells, the method comprising the steps of:
    forming a water-repellent layer on a surface of the carbon paper;
    forming a crack in the water-repellent layer; and
    forming a gas diffusion layer on the water-repellent layer having the crack formed therein, a portion of the gas diffusion layer entering a portion of the water-repellent layer that forms the crack and contacting the surface of the carbon paper.

2. The method of forming a gas diffusion layer on carbon paper used in fuel cells according to claim 1, wherein in the step of forming the crack, the crack is formed in the water-repellent layer by drying the water-repellent layer at a rate at which the crack is formed in a water-repellent material of the water-repellent layer.

3. Carbon paper having a gas diffusion layer formed thereon used in fuel cells, the carbon paper comprising:
    carbon paper;
    a water-repellent layer formed on a surface of the carbon paper; and
    a gas diffusion layer formed on the water-repellent layer, wherein
    a crack is formed in the water-repellent layer, and
    a portion of the gas diffusion layer enters the crack in the water-repellent layer and contacts the surface of the carbon paper so as to cover a portion of the water-repellent layer that forms the crack in the water-repellent layer.

* * * * *